Fig: 1
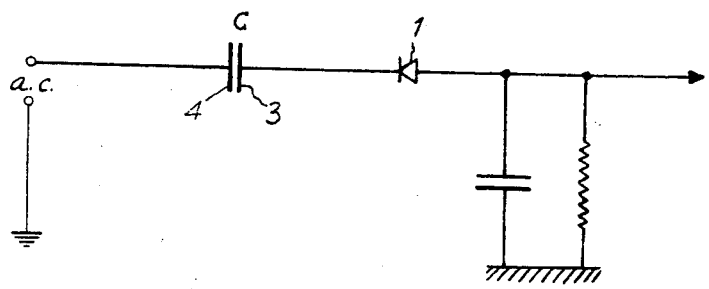
Fig: 2
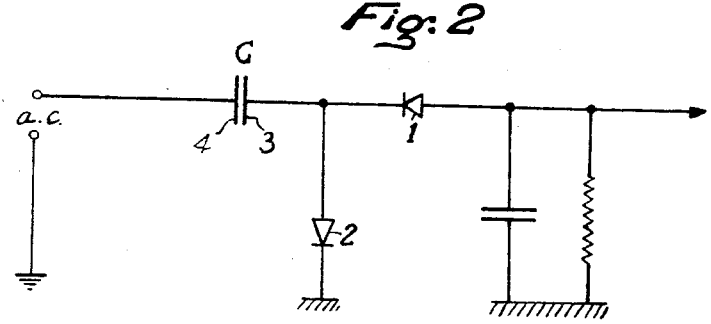
Fig: 3
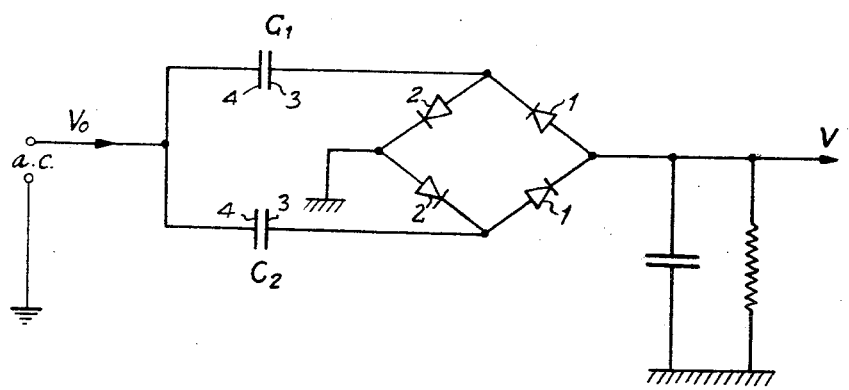
INVENTOR
Pierre ALAIS
By: McGlew and Toren
ATTORNEYS

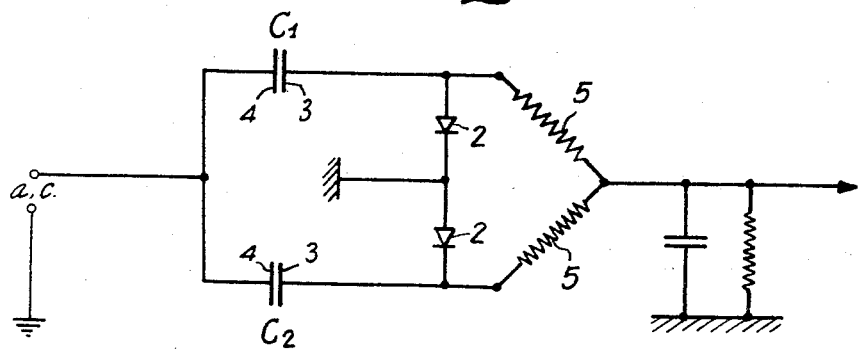
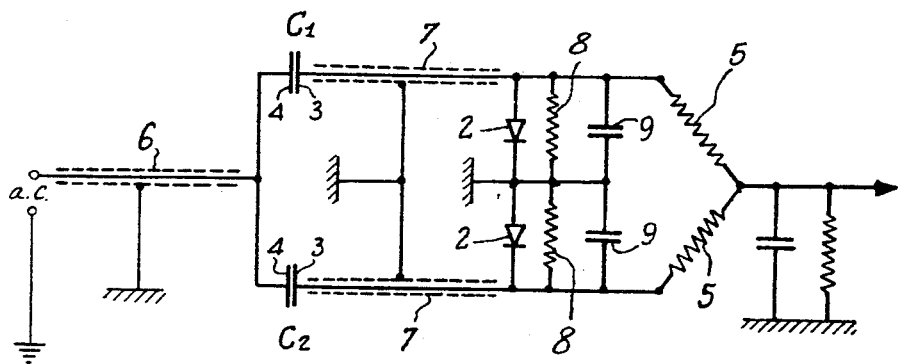

United States Patent Office 3,398,362
Patented Aug. 20, 1968

3,398,362
DISPLACEMENT MEASURING APPARATUS
INCLUDING DIODE COMPENSATING
RESISTANCES
Pierre Alais, 5 Rue Mathurin Regnier, Paris, France
Continuation of application Ser. No. 307,999, Sept. 10,
1963. This application Apr. 7, 1967, Ser. No. 629,332
Claims priority, application France, Sept. 20, 1962,
909,978; Apr. 2, 1963, 930,124
3 Claims. (Cl. 324—61)

ABSTRACT OF THE DISCLOSURE

Apparatus for measuring rectilinear and angular displacements and vibration is disclosed as including a pair of symmetrical, geometrically identical condensers arranged to have their respective capacity values varied linearly and equally but in respective opposite directions in accordance with variations in the values to be measured.

Background of the invention

This is a continuation of application Ser. No. 307,999, filed Sept. 10, 1963, now abandoned.

The present invention relates to a measuring method and apparatus which are applicable to the evaluation of rectilinear or angular displacements and by means of which it is possible to obtain a linear electric signal as a function of the displacement, over a wide range, which may extend from a micron to a centimetre or more, with exceptional sensitivity and resolution, as also very short response time. It is adaptable more particularly to the study or measurement of static or dynamic deformations of material and to the examination of vibrations of machine parts.

The method according to the invention utilises the known procedure which consists in utilising a variation of an electric capacitance resulting from the displacement to be measured for translating this displacement into a variation of an electric current, but it applies it in a novel manner and in accordance with an original technique by means of which it is possible to eliminate some of the defects inherent in the existing apparatus. These defects generally arise out of the fact that:

(a) The variation of the capacitance is not linear as a function of the displacement to be measured and the response linearity is only approximately valid over a very small range, the capacitances which are not attended by this defect generally having too small values to be used in a conventional apparatus.

(b) The variable capacitance is usually included in a bridge. The latter may become unbalanced under the action of temperature, in particular, and bring about a drift from zero.

The method and apparatus according to the present invention are characterised by the fact that there are employed two symmetrical capacitances varying linearly in opposite directions as a function of the displacement. It is known that it is sufficient, for example, for the displacement to produce a linear variation of the surface opposite the electrodes without modifying their spacing. As has been stated in the foregoing, capacitances of this type can, for technological reasons, be used only with low values of the order of a picofarad, but the information received in electrical form can be considerably enhanced by using a current at a high frequency of several tens of megacycles per second at which the impedance of the capacitances is considerably lowered. Moreover, the measurement no longer consists in evaluating the unbalance of a bridge, but in effecting a direct comparison of the two variable capacitances by means of a double detection system. By the term "double detection system" is meant an arrangement where there is simultaneous detection of two secondary signals, the arrangement deriving the difference between the two detected signals and the "difference" signal being the only signal at the output of the arrangement.

For an understanding of the principles of the invention, reference is made to the following description of typical embodiments thereof as illustrated in the accompanying drawings.

In the drawings:

FIG. 1 is a schematic wiring diagram of a simple detection circuit;

FIG. 2 is a schematic wiring diagram of a modification of the circuit shown in FIG. 1;

FIG. 3 is a schematic wiring diagram of a further modified form of the circuits shown in FIGS. 1 and 2;

FIG. 4 is a schematic wiring diagram of a detection circuit embodying the invention; and FIG. 5 is a schematic wiring diagram of a further detection circuit embodying the invention.

In the circuit of FIG. 1, which is a simple detection circuit, a diode 1 is arranged in series with a condenser or capacitance C having a primary electrode 4 and a secondary electrode 3, there being a filter circuit including a capacitance and a resistance connected across the output of this detection circuit. The conventionally employed circuit of FIG. 1 is unsuitable owing to the relative small size of the capacitance C, so that it is not useful for measurements of the type to which the present invention is directed.

In accordance with one feature of the invention, the addition of a second diode 2, as illustrated, in FIGURE 2, has the effect of suppressing the harmful effects of the parasitic capacitance of the diode 1 and of causing the secondary electrode 3 of the capacitance C to feed into the diode 1, which it does not do in the case of FIGURE 1, in which it may become biased, so that no continuous component is transmitted to the subsequent circuit. The diode 2 has the function of deriving from earth the parasitic current due to the capacitance of the diode 1 during the half-cycle in which it is regarded as blocked and of imparting an appropriate bias to the secondary electrode 3. The latter corresponds to a continuous component proportional to the capacitance C if the latter is subjected to a difference of potential of constant amplitude and frequency, and obviously if the external load applied to the diode also has constant impedance.

It is thus preferable for the primary electrode 4 to be subjected to a considerable high-frequency alternating potential of well-stabilised amplitude and frequency, and for the secondary electrode to remain at a comparatively low potential, which involves correctly adjusting the applied load in accordance with the requirements. Increasing the latter is equivalent to increasing the linearity, but reducing the voltage sensitivity and vice versa. FIGURE 3 illustrates the apparatus derived from the foregoing considerations, in association with a differential capacitive arrangement intended for the measurement of displacements. Since the two coupled detectors are connected in opposition, the continuous signal obtained at the output is proportional to the difference of the two capacitances $C_1$ and $C_2$, i.e. directly to the displacement to be measured.

The foregoing circuit arrangement has the disadvantage that it comprises the series-connected diodes 1 (FIGURE 3), and since these diodes do not constitute perfect valves their presence affects the linearity of the apparatus. At the cost of losing a little of the recoverable power at the output of the detecting arrangement, this primordial linearity is improved in many cases by replacing these diodes by resistances 5 which are appropriately adjusted as a function of the external load. The latter arrangement, which is illustrated in FIGURE 4, is preferable by reason of the exceptional linearity which can be obtained therewith.

In many cases, for reasons of the ambient thermal conditions or by reason of the available space, it is advantageous to be able to locate the high-frequency oscillator and the detecting arrangement, which are more sensitive to thermal variations than variable capacitances, at a distance from the measuring point. This is rendered possible as illustrated in FIGURE 5 by the use of a primary line 6 and two secondary lines 7 which are in resonance at the frequency employed, experience having shown that these lines do not affect the quality of the measurement and generally introduce only negligible errors. The resistances 8 and the capacitances 9 may be introduced to improve the resonance of the lines 7 and to adjust the sensitivity of the apparatus.

In the same manner as known from the prior art, the measurement of rectilinear and angular displacements and vibrations is effected by variation of the capacities of the condensers, and this may be effected in any desired manner such as by making one electrode of each condenser movable in accordance with the variations in rectilinear and angular displacements and vibrations.

While specific embodiments of the invention have been shown and described in detail to illustrate the application of the principles of the invention, it will be understood that the invention may be embodied otherwise without departing from such principles.

What is claimed is:

1. Apparatus for measuring rectilinear and angular displacements and vibrations comprising, in combination, two symmetrical, geometrically identical condensers arranged to have their respective capacity values varied linearly and equally, but in respective opposite directions, in accordance with variations in the values to be measured; circuit means connecting one terminal of each condenser to a first common junction point; a source of high frequency A.C. potential having a first terminal connected to said first common junction point; two diodes each having a first electrode connected to the opposite terminal of a respective condenser, the second electrodes of said diodes, having polarities opposite to each other, being interconnected at a second junction point; second circuit means connecting said second junction point to the second terminal of said source of high frequency A.C. potential, whereby said diodes are connected in series opposition to each other relative to a continuously transmitted signal component of a detection circuit; two substantially voltage independent equal value resistances each having a first end connected to a first electrode of a respective diode, the second ends of said resistances being interconnected at a third junction point constituting a first terminal of a detection circuit; said detection circuit including a third condenser having a first terminal connected to said input terminal and a second terminal connected to the second terminal of said source of high frequency A.C. potential, and a third resistance connected in parallel with said third condenser; said first two resistances having values corresponding to the load and constituting means compensating non-linear variations inherent in the characteristics of the diodes; whereby said first two condensers work under a substantially constant potential difference so that the intensity of the respective signal furnished by each condenser is substantially proportional to the value of the condenser; said first two condensers being charged during a half cycle when the connected diode is conductive and discharged during the succeeding half cycle when the connected diode is blocked, and said first two condensers being charged and discharged in alternation; each of said first two condensers, during discharge thereof, charging said third condenser.

2. Apparatus for measuring rectilinear and angular displacements and vibrations, as claimed in claim 1, including a pair of second resistances each connected in parallel with a respective one of said diodes.

3. Apparatus for measuring rectilinear and angular displacements and vibrations, as claimed in claim 2, including a pair of second condensers each connected in parallel with a respective second resistance.

References Cited

UNITED STATES PATENTS

| 2,604,512 | 7/1952 | Bacon et al. | 324—61 |
| 2,968,031 | 1/1961 | Higa | 324—61 XR |
| 3,012,192 | 12/1961 | Lion | 324—57 |
| 3,039,051 | 6/1962 | Locher | 324—61 |
| 3,260,934 | 7/1966 | Lion | 324—57 |

RUDOLPH V. ROLINEC, *Primary Examiner.*

E. E. KUBASIEWICZ, *Assistant Examiner.*